UNITED STATES PATENT OFFICE.

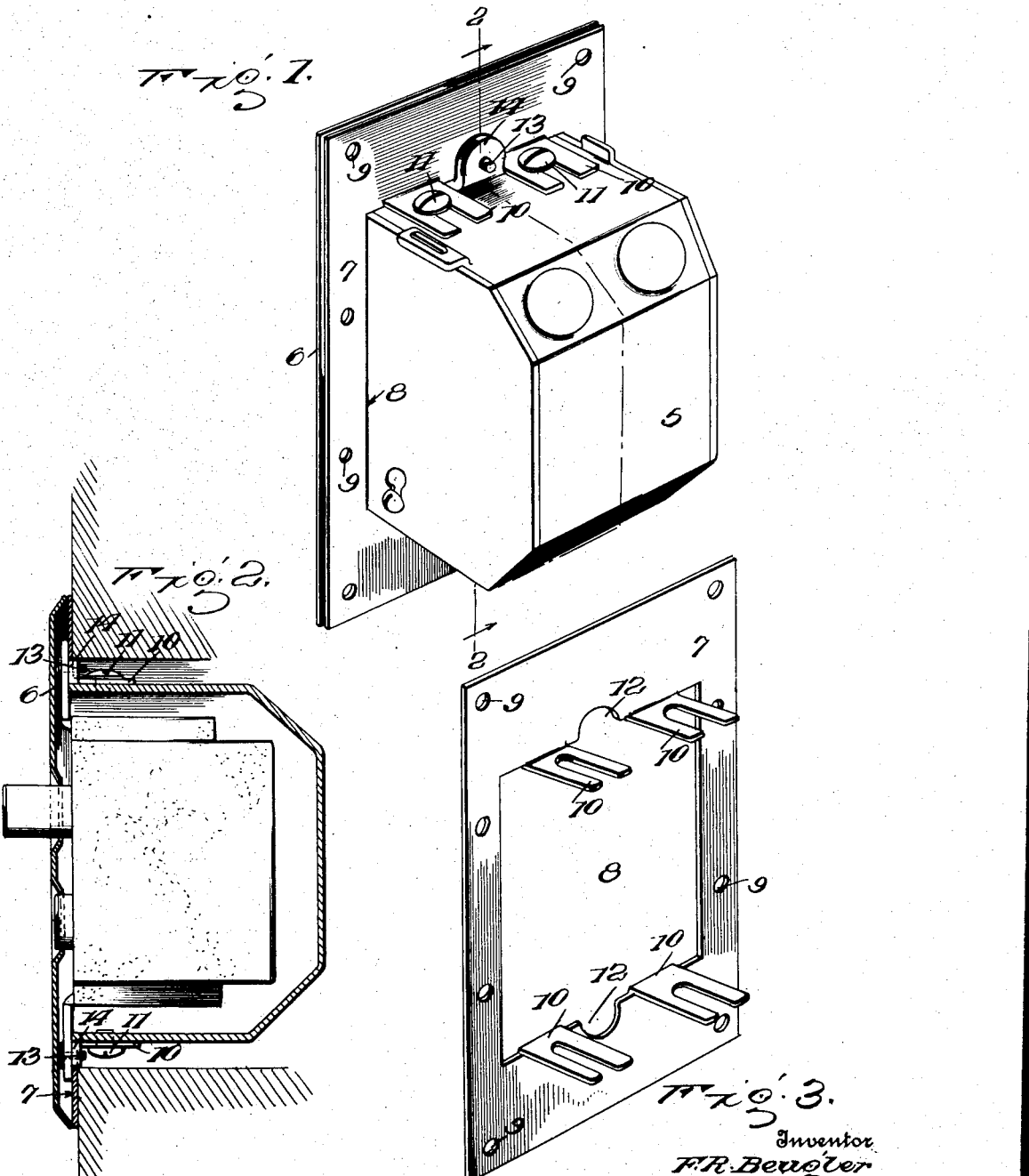

FRANK R. BEUGLER, OF BINGHAMTON, NEW YORK, ASSIGNOR, BY MESNE ASSIGNMENTS, TO GEORGE C. LEE, JR., AND HERMAN M. UNDERWOOD, BOTH OF BINGHAMTON, NEW YORK.

BOX-SUPPORTING FLUSH PLATE.

1,113,092.  Specification of Letters Patent.  Patented Oct. 6, 1914.

Application filed July 29, 1913. Serial No. 781,804.

*To all whom it may concern:*

Be it known that I, FRANK R. BEUGLER, a citizen of the United States, residing at Binghamton, in the county of Broome and State of New York, have invented certain new and useful Improvements in Box-Supporting Flush Plates, of which the following is a specification.

Heretofore it has been the common practice when switch boxes, outlet boxes and the like have been placed in walls to surround the opening cut in the wall with a wooden mat that is secured to the lathing or plastering, which results in an unsightly and unattractive structure.

The object of my invention is to produce a supporting plate which will not be visible when the cover plate of the switch outlet box or the like is in position, and which will securely and firmly support the box without danger of the same becoming loosened in the wall.

With the foregoing and other objects in view my invention consists in certain constructions, combinations and arrangements of parts, the preferred form of which will be first described in connection with the accompanying drawing and then the invention particularly pointed out in the appended claims.

Referring to the drawings wherein the same part is designated by the same reference numeral wherever it occurs, Figure 1 is a perspective view of a switch box provided with a supporting plate constructed in accordance with my invention, Fig. 2 is a section taken on line 2, 2 of Fig. 1 and Fig. 3 is a detail perspective view of my plate.

5 designates the casing of a well known switch box which is adapted to be placed in the wall and to be covered by a flush plate 6. The particular construction of the switch box is however entirely immaterial and is illustrated merely for the purpose of showing an application of my invention, and it is to be understood that my invention is adapted for use in any other forms of switch boxes as may be found desirable, and may also be used as a supporting plate for outlet or other boxes which it is desirable to place in a wall or the like.

7 designates a plate which may be formed of sheet metal, fiber, rubber or other suitable material, the plate having a central opening 8 of substantially the size of the box with which it is to be used, the frame surrounding the opening being provided with a plurality of screw holes 9, by means of which the plate is secured on the wall. At opposite ends of the plate I preferably provide two pair of spaced apart lugs 10, which extend at right angles to the plane of the plate and are adapted to straddle screws 11 secured in the ends of the box. I also preferably provide cut away portions 12 intermediate the lugs to permit of the screws 13 which hold the switch mechanism and box together by engaging the lugs 14 of the box.

In the use of my invention the lugs 10 are placed in position on the screws 11, and after the screws have been tightened up to lock the parts in proper position the box carrying the plate is inserted in the wall and positioned therein as desired. Screws are now passed through the screw holes 9, and thereafter the switch or other mechanism is secured in the box in the ordinary way, and the ordinary flush plate fastened thereover.

It will be noted that because of the spaced lugs on the plate the position of the box relative to the plate can be adjusted as may be necessary to bring the box in proper relation to the face of the wall. Furthermore the plate is entirely covered by the flush plate and consequently when the flush plate is in position is entirely invisible. It is to be understood that if found desirable a separate flush plate may be omitted and the supporting plate so shaped as to be a substitute for the flush or cover plate.

I am aware that considerable variation is possible in the details of construction herein shown and described, without departing from the spirit of my invention, and I do not intend to limit myself thereto, except as pointed out in the following claims, in which it is my intention to claim all the novelty inherent in the structure shown and described as broadly as the state of the art will permit.

Having thus described my invention what I claim as new and desire to secure by Letters Patent is:

1. The combination with a switch box, or the like, of a supporting plate surrounding the box, the face of the plate extending beyond the box and being provided with means at either end and along the sides for attaching the plate to the wall flush with the surface of the plaster, and carrying bifurcated parts extending from its face for the purpose of attaching the box to the plate.

2. The combination with a switch box, or the like, of a supporting plate surrounding the box, the face of the plate being provided with screw holes at either end and along the sides for the purpose of attaching to the wall flush with the surface of the plaster, and carrying bifurcated parts extending from the face of the plate for the purpose of attaching the box to the plate.

In testimony whereof I affix my signature in presence of two witnesses.

FRANK R. BEUGLER.

Witnesses:
R. F. BIEBER,
VERE H. MULTER.